United States Patent
Lyons et al.

(10) Patent No.: US 8,294,074 B2
(45) Date of Patent: *Oct. 23, 2012

(54) STEP-WISE INTENSITY CONTROL OF A SOLID STATE LIGHTING SYSTEM

(75) Inventors: Steve S. Lyons, Herndon, VA (US); Michael E. Garbus, Jr., Reston, VA (US); Matthew H. Aldrich, Arlington, VA (US)

(73) Assignee: ABL IP Holding LLC, Conyers, GA (US)

( * ) Notice: Subject to any disclaimer, the term of this patent is extended or adjusted under 35 U.S.C. 154(b) by 202 days.

This patent is subject to a terminal disclaimer.

(21) Appl. No.: 12/464,587

(22) Filed: May 12, 2009

(65) Prior Publication Data

US 2009/0218960 A1    Sep. 3, 2009

Related U.S. Application Data

(63) Continuation of application No. 11/717,122, filed on Mar. 13, 2007, now Pat. No. 7,560,677.

(51) Int. Cl.
*H05B 37/02*    (2006.01)
(52) U.S. Cl. ......... 250/205; 250/228; 362/227; 362/231
(58) Field of Classification Search .................. 250/205; 362/227, 231, 236, 240, 246, 250, 251
See application file for complete search history.

(56) References Cited

U.S. PATENT DOCUMENTS

| | | | |
|---|---|---|---|
| 6,007,209 A | 12/1999 | Pelka | |
| 6,222,172 B1 | 4/2001 | Fossum et al. | |
| 6,357,889 B1 | 3/2002 | Duggal et al. | |
| 6,969,843 B1 | 11/2005 | Beach et al. | |
| 6,995,355 B2 | 2/2006 | Rains, Jr. et al. | |
| 7,038,399 B2 | 5/2006 | Lys et al. | |
| 7,064,498 B2 | 6/2006 | Dowling et al. | |
| 7,108,413 B2 | 9/2006 | Kwong et al. | |
| 7,145,125 B2 | 12/2006 | May et al. | |
| 7,148,632 B2 | 12/2006 | Berman et al. | |
| 7,350,933 B2 * | 4/2008 | Ng et al. ......................... 362/84 |
| 2002/0145708 A1 | 10/2002 | Childers et al. | |
| 2003/0076056 A1 | 4/2003 | Schuurmans | |
| 2004/0160199 A1 | 8/2004 | Morgan et al. | |
| 2005/0156103 A1 | 7/2005 | May et al. | |

(Continued)

OTHER PUBLICATIONS

U.S. Office Action Issued in U.S. Appl. No. 11/233,036, dated on May 30, 2007.

*Primary Examiner* — Tony Ko
(74) *Attorney, Agent, or Firm* — McDermott Will & Emery LLP

(57) ABSTRACT

A solid state lighting system controls overall light output level in a step-wise manner by discretely controlling the ON/OFF state of its light emitters. Solid state emitters that are ON at a given time are set and kept at a level intended to produce a desired output characteristic, e.g. at a level to produce a described color of light. The system utilizes optical processing of the generated light, for example by diffuse reflection in an optical integrating cavity, sufficient to convert the point source output(s) from the emitting elements into a uniform virtual source output. The virtual source output appears uniform regardless of how many emitters are ON or OFF, and only the perceptible intensity of the light output changes with the number of emitters that the system has ON.

24 Claims, 3 Drawing Sheets

U.S. PATENT DOCUMENTS

| | | |
|---|---|---|
| 2005/0161586 A1 | 7/2005 | Rains, Jr. et al. |
| 2006/0072314 A1 | 4/2006 | Rains |
| 2006/0081773 A1 | 4/2006 | Rains, Jr. et al. |
| 2006/0086897 A1 | 4/2006 | May et al. |
| 2006/0203483 A1 | 9/2006 | Rains, Jr. et al. |
| 2006/0208667 A1 | 9/2006 | Lys et al. |
| 2006/0237636 A1 | 10/2006 | Lyons et al. |
| 2007/0138978 A1 | 6/2007 | Rains et al. |

\* cited by examiner

| Brightness Level | $C_1$ | $C_2$ | $C_3$ | # LEDs ON |
|---|---|---|---|---|
| 0 | 0 | 0 | 0 | 0 |
| 1 | 1 | 0 | 0 | 6 |
| 2 | 0 | 1 | 0 | 8 |
| 3 | 0 | 0 | 1 | 12 |
| 4 | 1 | 1 | 0 | 14 |
| 5 | 1 | 0 | 1 | 18 |
| 6 | 0 | 1 | 1 | 20 |
| 7 | 1 | 1 | 1 | 26 |

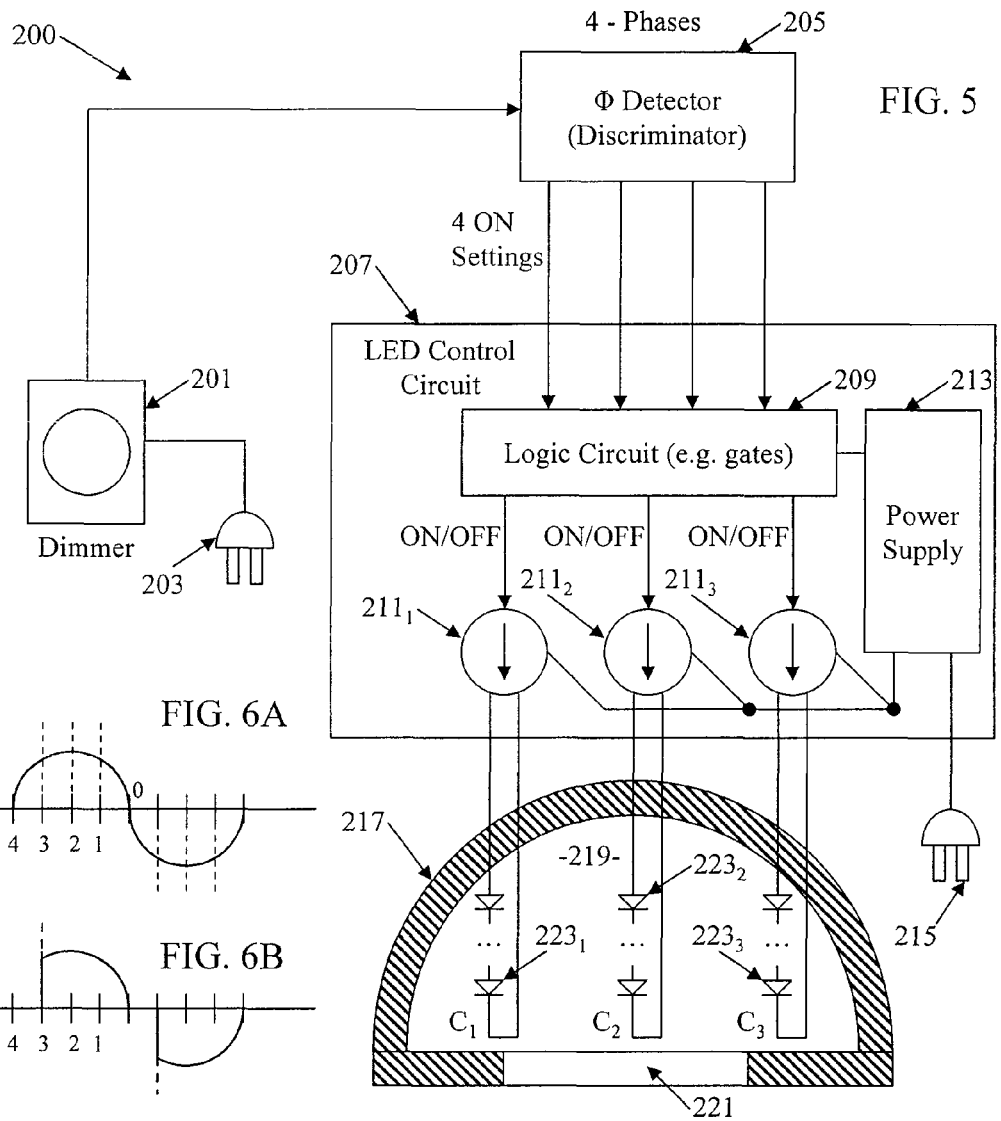
FIG. 5
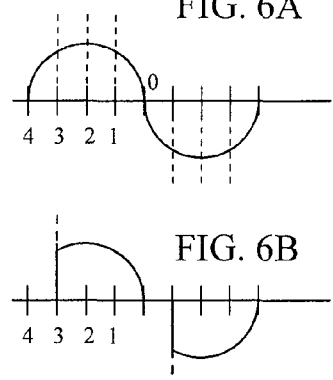
FIG. 6A
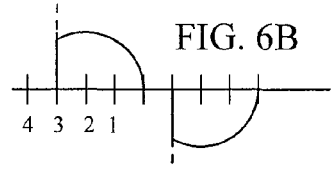
FIG. 6B
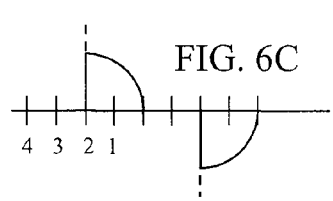
FIG. 6C
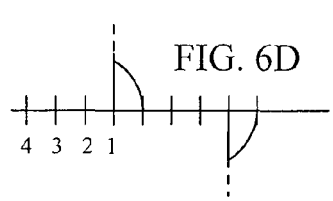
FIG. 6D
FIG. 7
| Channel | Setting | | | |
|---|---|---|---|---|
| $C_1$ 6 LEDs | ⟩1 | | ⟩3 | ⟩4 |
| $C_2$ 8 LEDs | | | | |
| $C_3$ 12 LEDs | | ⟩2 | | |
| # LEDs ON | 6 | 12 | 18 | 26 |

STEP-WISE INTENSITY CONTROL OF A SOLID STATE LIGHTING SYSTEM

RELATED APPLICATIONS

This application is a continuation of U.S. application Ser. No. 11/717,122 filed Mar. 13, 2007, now U.S. Pat. No. 7,560,677, the entire contents of which is hereby incorporated by reference.

TECHNICAL FIELD

The present subject matter relates to techniques and equipment to control the output level of lighting systems that utilize solid state light emitters, in a step-wise fashion in combination with diffuse processing of the optical output, e.g. using an optical integrating cavity.

BACKGROUND

In recent years, solid state light emitting elements, such as light emitting diodes (LEDs), have become available that produce relatively high intensities of output light, which has enabled use of such devices in general light applications, signage applications and a verity of other areas long dominated by more conventional light sources, such as incandescent and florescent lights. Many lighting applications require control of the level of output over a fairly wide range of light output, that is to say from a minimum light output level up to some full-ON output level. Most conventional light sources can be 'dimmed' in a relatively continuous manner, e.g. by adjusting the level or duty cycle of the voltage/current applied to drive the light source. Systems using solid state light emitting elements also can have intensity control, for dimming or the like, and there have been several ways to implement such output level control.

One approach to controlling the light output of a system or device that uses one or more solid state light emitting elements involves adjusting the magnitude of the current applied to drive the solid state light emitting element(s). LEDs, for example, produce a light output that is roughly proportional to the applied current level, over some portion of their operating range. However, for substantial changes, the changes in operating state of a LED will change the color of the light output. For example, if a LED is rated to output a particular color of light for a specified input drive current, the output light color will shift from the rated color as the input drive current is reduced substantially below the specified drive current level. Hence, dimming light output of solid state light emitting elements often is limited by the degree of current level reduction possible before there is an undesirable degree of color shift.

Another approach to controlling the light output of a system or device that uses one or more solid state light emitting elements involves modulating the signal used to drive the solid state light emitting element(s) and varying the degree of modulation. Amplitude modulation may cause a color shift, similar to that resulting from reduction in the magnitude of the drive current. Hence, many systems today control light output of LEDs or other solid state emitters by pulse width or duty cycle type modulation. With a pulse width modulation (PWM) approach for an LED based system, for example, each LED is driven by a pulse signal. The frequency of the pulse signal is sufficiently high that a human observer normally does not perceive the pulse of the LED output. Adjustment of the percent modulation of the pulse drive signal adjusts the width of the drive pulse, and thus the ON-time of the LED during each cycle of the pulse signal. The human eye tends to perceive an integral of light over short periods of time, so the adjustment of the LED ON-time, adjusts the perceived light output of the LED. With a PWM approach, however, if the ON-time is particularly low (for a desired low output level) the human observer may see a perceptible flicker.

Solid state lighting emitting elements provide relatively small point source outputs. For many lighting applications, each lighting system includes a number of LEDs or other solid state lighting emitting elements. Often, the system will include a diffuser or the like. However, within a certain range of distance from the system, an observer can see the individual outputs of the solid state lighting emitting elements. In many applications, the individual point source appearance may be undesirable. Not all emitters respond identically to a given input signal, particularly over a wide range of variations of the input signal. Variations in drive signals applied to different LEDs or the like to change system output level may cause different solid state lighting emitting elements within one system to provide different levels or colors of light output. In system arrangements where the point source outputs are perceptible, the differences in output level or color also will be perceptible to the human observer. For example, if an individual LED in an array cuts-OFF, because of a low drive current level, but other LEDs in the array remain ON, the observer will see a black spot or hole in the array at the location of the LED that is not emitting any light.

A need exists for a way in which to control light output level, in solid state lighting systems for a variety of different types of lighting applications, which avoids or mitigates any or all of the above discussed problems.

SUMMARY

The teachings herein alleviate one or more of the above noted problems with controlling the overall output level of a lighting system that utilizes solid state light emitting elements. As disclosed herein, such a system includes a number of such light emitting elements, and the number of such elements that are ON is controlled in a discrete manner to control the system output level (intensity and/or brightness) in a step-wise fashion. The system also utilizes optical processing of the generated light, for example by diffuse reflection in an optical integrating cavity, sufficient to convert the point source output(s) from the emitting elements into a virtual source of uniform light output.

Hence, a lighting system as disclosed herein might include a first solid state light emitting element for emitting a color of light and a second solid state light emitting element for emitting the same color of light. An optical processing element is coupled to receive light emitted from the first and second solid state light emitting elements. The optical processing produces a virtual source of light of the particular color, at a luminous output area of the lighting system. The system also includes a control circuit connected to the solid state light emitting elements to selectively activate and deactivate those elements. The control circuit drives each of the light emitting elements to operate at a respective predetermined level whenever activated. The selective activation and deactivation of the first and second solid state light emitting elements provides a number of discrete intensity levels for the virtual source of light.

Also disclosed are methods of controlling intensity of light output from a solid state lighting system comprising first and second solid state light emitting elements for emitting the same color of light. Such a method might involve receiving a first input representing a first desired brightness level. In response to the first input, the first solid state light emitting element is driven to emit light at a predetermined intensity level for that emitting element, while maintaining the second solid state light emitting element in an inactive state. For the first desired brightness level, the method also entails diffusely processing light emitted from the first solid state light emitting element to produce a virtual source of light at a luminous output area of the lighting system corresponding in intensity to the first desired brightness level. The methodology also includes a step of receiving a second input representing a second desired brightness level higher than the first desired brightness level. In response to the second input, the first solid state light emitting element is driven to emit light of the color at the predetermined intensity level for that first emitting element, and the second solid state light emitting element is driven to emit light at a predetermined intensity level for the second solid state light emitting element. For the second desired brightness level, the method also entails diffusely processing light emitted from the two solid state light emitting elements to produce a virtual source of light of said color at the luminous output area of the lighting system, which corresponds in intensity to the second desired brightness level.

The discrete ON-OFF control allows all emitters that are ON at a given time to be set and kept at a level intended to produce a desired output characteristic, e.g. at a level to produce a described color of light. If modulated, the duty cycle can easily be set to and kept at a level that avoids perceptible light flickering, although typically unmodulated current is used to drive each emitting element at or near its rated level in the specific examples below. The virtual source output, however, is relatively uniform, for example, so that an observer does not see point sources and does not see which emitters may be ON and which may be OFF. The output appears uniform regardless of how many emitters are ON or OFF, and only the perceptible intensity of the light output changes with the number of emitters that the system has ON.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 5 is a functional block type circuit diagram, of another implementation of the system circuitry.

FIG. 6A to 6D are waveform diagrams illustrating AC signals produced by a standard dimmer control circuit, which may be used for input of intensity settings in the system of FIG. 5.

FIG. 7 is a table of the intensity states for different settings, which may be provided by the circuitry of FIG. 5.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The output intensity control techniques, e.g. for dimming, rely on selective ON/OFF control of solid state light emitting devices or sets of solid state emitters, in discrete steps. While ON, each active solid state light emitter is controlled in a relatively constant manner, e.g. to achieve a desired overall light generation. While ON, the individual drive current amplitude or drive modulation need not be adjusted to vary the overall system output brightness. A diffusely reflective cavity or chamber reflects light from the active solid state light emitter(s) and combines the light in such a manner as to produce a virtual source output. In this way, the number of emitters that are active are not readily apparent from an area illuminated by the system. For example, the emitters that are ON and those that may be OFF will not be observable by a person in the area illuminated by the system. The virtual source output maintains the same color and remains uniform, at all system intensity steps. Only a step-wise change in brightness will be readily apparent. Also, the virtual source output will have the desired characteristic, e.g. color. Changes in intensity will not cause a color shift due to differences in drive current intensity and will not cause flickering as might otherwise result from changing output by pulse modulation of the drive currents.

Figure 1:
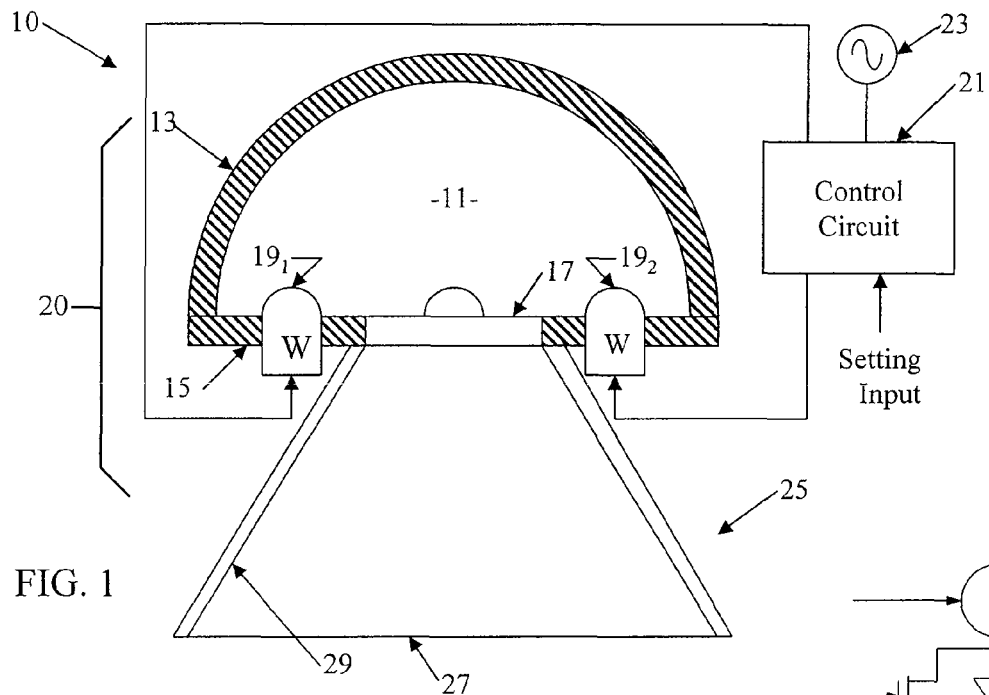
FIG. 1 is a block diagram of an exemplary solid state lighting system implementing step-wise control of overall output intensity, with the fixture portion of the system shown in cross-section.

FIG. 1 is a partial block diagram and a cross-sectional illustration of the light fixture for a light distribution apparatus or system 10. For illumination or task lighting applications, the fixture emits light in the visible spectrum. As discussed in detail below, the system 10 includes a number of solid state light emitters coupled to an optical integrating cavity. A control circuit adjusts virtual source output intensity by selective discrete ON/OFF control of the solid state light emitters.

Hence, the illustrated system 10 includes an optical cavity 11 having a diffusely reflective interior surface, to receive and diffusely process light energy from a number of sources discussed below. The optical cavity 11 typically functions as an optical integrating cavity. The cavity 11 may have various shapes. The illustrated cross-section would be substantially the same if the cavity is hemispherical as in a circular spotlight type arrangement, or if the cavity is semi-cylindrical as in a linear lighting product with the cross-section taken perpendicular to the longitudinal axis. At least a substantial portion of the interior surface(s) of the cavity 11 exhibit(s) diffuse reflectivity. It is desirable that the cavity surface have a highly efficient reflective characteristic, e.g. a reflectivity equal to or greater than 90%, with respect to the relevant light wavelengths. In the example of FIG. 1, the surface is highly diffusely reflective to energy in the visible, near-infrared, and ultraviolet wavelengths.

For purposes of further discussion of the example, we will assume that the fixture is circular, therefore the cavity 11 is approximately hemispherical. The cavity 11 may be formed of a hemispherical dome 13 and a substantially flat cover plate 15. At least the interior facing surfaces of the dome 13 and the cover plate 15 are highly reflective, and at least a substantial portion of one or both of those surfaces is diffusely reflective, so that the resulting cavity 11 is highly diffusely reflective with respect to the light spectrum produced by the system 10. As a result, the volume or chamber 11 is an integrating type optical cavity. Although shown as separate elements, the dome and plate may be formed as an integral unit. The cavity may have any shape, although hemispherical and partially cylindrical shapes are easier to model, and in at least some cases, are easier to implement in actual fixtures. For additional information as to the structure of the cavity and a number of examples of other possible cavity shapes, attention may be directed to U.S. Pat. No. 6,995,355, the disclosure of which is entirely incorporated herein by reference.

The optical integrating cavity 11 has an optical aperture 17, as a transmissive path for allowing emission of reflected/combined light from within the cavity 11 toward a region intended to be illuminated by the system 10. In the example, the optical aperture 17 is a passage through the approximate center of the cover plate 15, although the aperture or other apertures may be at other locations on the plate and/or the dome. Because of the diffuse reflectivity within the cavity 11, light within the cavity is integrated, mixed or combined before passage thereof out of the aperture 17. As noted, the aperture 17 is transmissive to light. Although shown as a physical opening, the aperture may be formed by a transmissive material, e.g., a transparent or translucent material, a lens, a diffuser, or the like.

In the example, the system 10 is shown emitting the combined light downward through the aperture 17, for convenience. However, the light fixture part of the system 10 may be oriented in any desired direction to perform a desired light application function, for example to provide visible illumination of persons or objects in a particular direction or location with respect to the fixture or to illuminate an area or room.

The lighting system 10 also includes a number of sources of light energy. The fixture geometry discussed herein may be used with any appropriate type of light sources. Although other types of sources of radiant electromagnetic energy may be combined, such as various conventional forms of incandescent, arc, neon and fluorescent lamp, for purposes of this discussion, the system 10 includes a number of solid state light emitting elements organized in discretely controllable sets of one or more emitters each, represented by exemplary light emitting diodes (LEDs) 19 in the drawing. Although the LEDs 19 or other solid state light emitters may emit various colors of light for combination in the cavity 11, for purposes of this example, the LEDs all emit white light of substantially the same characteristic (e.g. the same color temperature).

As discussed herein, applicable solid state light emitters essentially include any of a wide range light emitting or generating devices formed from organic or inorganic semiconductor materials. Examples of solid state light emitting elements include semiconductor laser devices and the like. Many common examples of solid state light emitters, however, are classified as types of "light emitting diodes" or "LEDs." This exemplary class of solid state light emitting devices encompasses any and all types of semiconductor diode devices that are capable of receiving an electrical signal and producing a responsive output of electromagnetic energy. Thus, the term "LED" should be understood to include light emitting diodes of all types, light emitting polymers, organic diodes, and the like. LEDs may be individually packaged, as in the illustrated examples. Of course, LED based devices may be used that include a plurality of LEDs within one package, for example, multi-die LEDs that contain separately controllable red (R), green (G) and blue (B) LEDs within one package. Those skilled in the art will recognize that "LED" terminology does not restrict the source to any particular type of package for the LED type source. Such terms encompass LED devices that may be packaged or non-packaged, chip on board LEDs, surface mount LEDs, and any other configuration of the semiconductor diode device that emits light. Solid state lighting elements may include one or more phosphors and/or nanophosphors based upon quantum dots, which are integrated into elements of the package or light processing elements of the fixture to convert at least some radiant energy to a different more desirable wavelength or range of wavelengths.

The color or spectral characteristic of light or other electromagnetic energy relates to the frequency and wavelength of the radiant energy and/or to combinations of frequencies/wavelengths contained within the energy. Many of the examples herein relate to colors of white light or other light colors within the visible portion of the spectrum, although examples also are discussed that utilize or emit other energy. Electromagnetic energy, typically in the form of light energy from the one or more solid state light emitters, is diffusely reflected and combined within the cavity 11 to form combined light and form a virtual source of such combined light at the aperture 17. Such integration, for example, combines light from multiple sources and spreads the combined light from the small point sources represented by the emitter outputs or couplings thereof to the cavity, across the broader area of the aperture 17. The integration tends to form a relatively Lambertian distribution across the virtual source. When the system illumination is viewed from the area illuminated by the combined light, the virtual source at aperture 17 appears to have substantially infinite depth of the integrated light. Also, the visible intensity is spread uniformly across the virtual source, as opposed to individual small point sources of higher intensity as would be seen if the one or more elements were directly observable without sufficient diffuse processing before emission through the aperture 5.

Pixelation and color striation are problems with many prior solid state lighting systems. When the prior fixture output is observed, the light output from individual LEDs or the like appear as identifiable/individual point sources or 'pixels.' Even with diffusers or other forms of common mixing, the pixels of the sources are apparent. The observable output of such a prior system exhibits a high maximum-to-minimum intensity ratio. In systems using multiple light color sources, e.g. RGB LEDs, unless observed from a substantial distance from the fixture, the light from the fixture often exhibits striations or separation bands of different colors.

Systems and light fixtures as disclosed herein, however, do not exhibit such pixelation or striations. Instead, the diffuse optical processing converts the point source outputs of the one or more solid state light emitters to a virtual source output of light, at or downstream from the aperture 17 in the examples using optical cavity processing. The virtual source output is unpixelated and relatively uniform across the apparent output area of the fixture, e.g. across the optical aperture 17 of the cavity 11 in the illustrated example. The optical integration sufficiently mixes the light from the solid state light emitters 19 that the light output of the virtual source is at least substantially Lambertian in distribution across the optical output area of the fixture, that is to say across the aperture 17 of the cavity 11.

As a result, the light output exhibits a relatively low maximum-to-minimum intensity ratio across the aperture 17. A common measure of uniformity, the maximum-to-minimum intensity ratio is computed by dividing the intensity measured at the brightest point on the luminous output area, e.g. the brightest point on the aperture, with respect to the intensity measured at the dimmest point on the luminous area. Intensity measurements may be taken in candela. In the examples shown herein, the virtual source light output exhibits a maximum to minimum ratio of 2 to 1 or less over substantially the entire luminous optical output area. Stated another way, the dimmest point will have an intensity at least half as bright as the intensity at the brightest point.

The examples rely on various implementations of the optical integrating cavity 11 as the optical processing element to achieve this level of output uniformity at the virtual source, however, other mixing elements could be used if they are configured to produce a virtual source with such a uniform output (Lambertian and/or relatively low maximum-to-minimum intensity ratio across the fixture's optical output area). In the example of FIG. 1, the uniform virtual source light output would be at the aperture 17, although the virtual source output may appear at the output of a further processing element downstream from the aperture, such as the output of the deflector or a further diffuser. The area of the virtual source is at least one order of magnitude larger than the combined areas of the point source outputs of the LEDs 19 or other solid state emitters.

It also should be appreciated that solid state light emitting elements may be configured to generate electromagnetic energy having various bandwidths for a given spectrum (e.g. narrow bandwidth of a particular color, or broad bandwidth centered about a particular), and may use different configurations to achieve a given spectral characteristic. For example, one implementation of a white LED may utilize a number of dies that generate different primary colors which combine to form essentially white light. In another implementation, a white LED may utilize a semiconductor that generates light of a relatively narrow first spectrum in response to an electrical input signal, but the narrow first spectrum acts as a pump. The light from the semiconductor "pumps" a phosphor material contained in the LED package, which in turn radiates a different typically broader spectrum of light that appears relatively white to the human observer. Alternatively, the phosphors and/or nanophosphors based upon quantum dots may be doped into one or more of the reflective surfaces of the system, such as all or a portion of the reflective inner surface of the cavity 11, as discussed in greater detail in US application publication no. 2006/0072314.

The examples use a number of LEDs or a number of groups of LEDs emitting the same color. For the step-wise control, for simplicity, the exemplary systems use a single color of light emitters. However, the present teachings may also be applied in systems emitting multiple colors, although there would be a number of emitters or groups of emitters of each color.

As noted, the exemplary system 10 uses white LEDs 19 as the solid state light emitters. Each LED 19 is coupled to supply light to enter the cavity 11 at a point that directs the light toward a reflective surface so that it reflects one or more times inside the cavity 11, and at least one such reflection is a diffuse reflection. In an example where the aperture is open or transparent, the points of emission into the cavity are not directly observable through the aperture 17 from the region illuminated by the fixture output. Various couplings and various light entry locations may be used. In this way, the cavity 11 effectively integrates, mixes or combines the light energy of from the LEDs 19, so that the integrated or combined light emitted through the aperture 17 includes the light energy from the various sources in relative amounts substantially corresponding to the relative amounts that the sources input into the cavity 11. The output of each LED 19 is not perceptible as a point light source of high intensity, from the perspective of an area illuminated by the system 10.

The solid state lighting system 10 also includes a control circuit 21 coupled to the LEDs 19 for establishing output intensity of electromagnetic energy generated by each of the LED sources. The control circuit 21 typically includes a power supply circuit coupled to a source, shown as an AC power source 23. The control circuit 21 also includes an appropriate number of LED driver circuits for controlling the power applied to the LEDs 19 and thus the amount of energy supplied to the cavity 11 from each emitter. It is possible that the power could be modulated to control respective light amounts output by the LEDs, however, in the examples, LED outputs are controlled by controlling the amount of current supplied to drive respective LEDs. The control circuit 21 may be responsive to a number of different control input signals, for example, to one or more user inputs as shown by the arrow in FIG. 1. Although not shown in this simple example, feedback may also be provided. Specific examples of the control circuitry are discussed in more detail later.

The dome 13 and cover plate 15 forming the cavity, together with the LEDs 19 and possibly one or more processing elements for processing the light output through the aperture 17 (such as a deflector), form a light fixture 20. The integrating or mixing capability of the cavity 11 serves to project combined light of an amount determined by the amount of light output by the various LED light sources 19 coupled into the cavity 11.

The fixture 20 optically processes the totality of light output from a family of LEDs 19. To provide adjustment or variability, it is not necessary to control the output of individual LEDs, except as they contribute to the totality. For example, it is not necessary to modulate the LED outputs, to set respective output levels, although modulation may be used if desirable for particular applications. Also, the distribution pattern of the individual LEDs and their emission points into the cavity are not significant. The LEDs 19 can be arranged in any manner to supply light energy within the cavity, although it is preferred that direct view of the LEDs from outside the fixture is minimized or avoided. The LEDs 19 may be mounted for direct emission into the cavity 11 or optically coupled by fibers or other waveguides to supply light to points on the cavity wall(s) from remote locations.

Hence, control of the drive currents applied to drive light production by the LEDs 19 controls the characteristics of the combined light output by the fixture 20. Of note for purposes of this discussion, the control circuit 21 sets drive currents for active LEDs 19 to a level intended to provide desired performance of each device 19, e.g. efficient output of desired color without excessive heating.

All of the LEDs that are active run at a desired setting, typically at or near the rated current/output of the particular type of LEDs. Adjustment of system output, that is to say combined emission through the system aperture (and deflector if provided) is controlled by adjusting the number of the LEDs 19 that are ON at any given time. In the maximum ON condition, all of the LEDs 19 would be ON. To dim the output down, one or more of the LEDs are turned OFF. As more LEDs are turned OFF, the system output level decreases in steps, corresponding to the numbers of LEDs that are ON/OFF at each setting, until all of the LEDs 19 are OFF, at which point the system output is OFF.

Hence, in the example of FIG. 1, the control circuit 21 also controls which of the LED devices 19 are ON and which if any are OFF, in order to set an overall output level of the system 10. The discrete control of the ON/OFF state of the LEDs does not change the drive current, e.g. level and/or modulation, for those devices that are active. Instead, devices are turned ON to increase intensity and devices are turned OFF to dim the output down.

The step-wise intensity control may be applied on a LED by LED basis. In the simplest form, the circuit 21 might turn all LEDs 19 ON for a maximum output state. If there are only two LEDs $19_1$, $19_2$ of the particular color (white (w) in the example), for a half-maximum intensity setting, the circuit 21 might turn only the LED $19_1$ or it might turn ON only the LED $19_2$. A typical implementation would have a larger number of LEDs; and the control circuit would increment the intensity level by turning ON another one of the LEDs 19, or the control circuit would decrement (dim down) the intensity level by turning OFF another one of the LEDs 19. In any case, the virtual source output of the fixture 20 (e.g. at the aperture 17) would remain substantially uniform across the area of the virtual source output. The incremental changes in the number of active LEDs 19 would only produce a corresponding incremental change in the output intensity of the virtual source.

In a specific circuit example discussed below, strings of LEDs are controlled to provide step-down dimming and step-up intensity increases. In such an arrangement, the control circuit turns ON-OFF some number of strings, where each string comprises at least one and typically a plurality of LEDs. The strings may have the same numbers of LEDS, although examples are discussed in detail that have different numbers of LEDs in each string, so that combinations of active strings produce a larger number of discrete steps of output intensity, in the range between full-ON and full-OFF.

Figure 2:
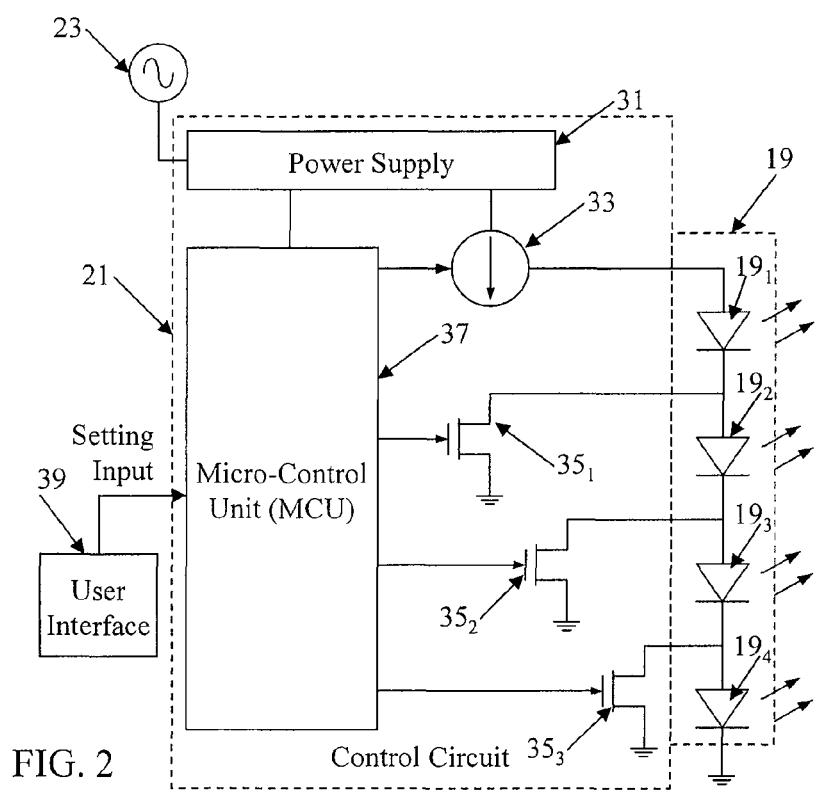
FIG. 2 is a functional block type circuit diagram, of a first implementation of the system circuitry.

FIG. 2 provides a block diagram of the circuitry that might be used in the system 10, essentially as a first example of an arrangement to implement the step-wise intensity control. In this example, the system includes a set or array 19 of the LEDs coupled to the cavity in the manner discussed above relative to FIG. 1. The array 19, in this simple example, includes 4 LEDs $19_1$ to $19_4$, although actual implementations may include a larger number of LEDs. The LEDs $19_1$ to $19_4$. are serially connected to form of a tapped line.

The control circuit 21 includes a power supply circuit 31 coupled to the AC power source 23. The control circuit 21 also includes LED driver circuitry, in this example comprising a constant current source 33 and a number of switches. The transistors $35_1$ to $35_3$ serve as switches to selective activate and deactivate LEDs, in this example to selectively connect taps points to ground. Alternative arrangements could be used, e.g. with switching transistors or other switches connected to selectively bypass individual LEDs in the line, as in FIG. 2A. In the example of FIG. 2, the constant current source 33 supplies constant current to the serially connected LEDs $19_1$ to $19_4$. The three switching transistors $35_1$ to $35_3$ connect between the taps of the line of LEDs and ground, so that activation of the switching transistors $35_1$ to $35_3$ selectively connect the tap points to ground.

The control circuit 21 also includes appropriate control logic. The logic could utilize appropriate gate circuits. In this example, the logic is implemented by a programmable microcontrol unit (MCU) 37. The MCU 37 is responsive to digital data, representing level setting inputs, from a user interface device 39. In later examples, the LEDs are turned ON-OFF in groups or strings. However, in this first example, the MCU 37 activates/deactivates LEDs $19_1$ to $19_4$, on an individual basis. To that end, the MCU 37 is connected to provide an ON-OFF signal to the current source 33 and ON-OFF signals to each of the switching transistors $35_1$ to $35_3$. The MCU 37 is programmed to perform the control of the LEDs, in a step-wise manner, in response to signals from the user interface 39 indicating desired intensity setting levels selected by the user. A variety of different user interfaces may be used, or the intensity setting may be provided on some automatic basis.

In the example, the MCU 37 turns OFF the LEDs 19 entirely by turning the constant current source 33 OFF. When the system is turned ON, the MCU activates the source 33 to generate current. However, as long as the system is ON, the source 33 generates a constant current to drive the LEDs 19, regardless of the number of LEDs currently activated. In the example, assume that all of the LEDs 19 are of the same type and have the same current rating for generating substantially the same color temperature of white light. The source 33 is configured to generate a level of current at or near the rated current of the LEDs 19. Preferably, the current corresponds to the rated current, but it may be within a range around the rated value at which the LEDs will still generate white light of the rated color temperature.

Assuming that the MCU 37 has turned ON the current source 33, at least the LED $19_1$ will emit light. The MCU 37 controls whether the LEDs $19_2$ to $19_4$ are active or selectively connected to ground, by its selective activation of the switching transistors $35_1$ to $35_3$. When the MCU 37 deactivates all of the switching transistors $35_1$ to $35_3$, all of the transistors are in an open-circuit (high impedance) condition; and current from the source 33 flows through all 4 of the LEDs $19_1$ to $19_4$. In this state, the system is full ON (100%) because all 4 of the LEDs 19 are ON. From the ON state, the MCU can dim down the output in response to an appropriate setting input by turning ON one or more of the switching transistors 35. Of course, the MCU reverses the process to increase intensity, in response to appropriate inputs.

For example, when the MCU 37 activates the switching transistor $35_3$, the transistor appears as a closed switch (low impedance) and thereby connects the tap point between the transistors $19_3$ and $19_4$ to ground. Current from the source 33 flows through the LEDs $19_1$ to $19_3$ and through the switching transistor $35_3$ to ground, effectively bypassing the LED $19_4$. In this state, the LEDs $19_1$ to $19_3$ are ON; but the LED $19_4$ is OFF. The system will provide a light output of an intensity corresponding to 75% of maximum (3 of 4 LEDs 19 are ON).

Activating the switching transistor $35_2$ provides a low impedance (closed switch) connection of the tap point between the transistors $19_2$ and $19_3$ to ground. Current from the source 33 flows through the LEDs $19_1$ and $19_2$ and through the switching transistor $35_2$ to ground, effectively bypassing the LEDs $19_3$ and $19_4$. In this state, the LEDs $19_1$, and $19_2$ are ON; but the LEDs $19_3$ and $19_4$ are OFF. The system will provide a light output of an intensity corresponding to 50% of maximum (2 of 4 LEDs 19 are ON).

Activating the switching transistor $35_1$ closes that switch (low impedance) and thereby connects the tap point between the transistors $19_1$ and $19_2$ to ground. Current from the source 33 flows through the LED $19_1$ and through the switching transistor $35_1$ to ground, effectively bypassing the LEDs $19_2$ to $19_4$. In this state, the LED $19_1$ is ON; but the LEDs $19_2$ to $19_4$ are OFF. The system will provide a light output of an intensity corresponding to 25% of maximum (1 of 4 LEDs 19 are ON).

In the circuit of FIG. 2, except for the full ON state (100%), some number of the LEDs 19 will be OFF. If the LED outputs were directly perceptible from the area or region illuminated by the system, a person would see the deactivated LED(s) as dark spots compared to the bright spots represented by the active LED(s). However, because the system uses a cavity or the like to convert the point light sources provided by the LEDs into a virtual source, e.g. at the aperture 17 of the cavity 11 in the example of FIG. 1, a person will not be able to see or otherwise perceive the state of specific point sources. Instead, all that is visible as LEDs are turned ON and OFF is a visible change in the intensity of the virtual source. At any given intensity, the virtual source appears to have a relatively uniform output distribution, as discussed above relative to FIG. 1.

Figure 2A:
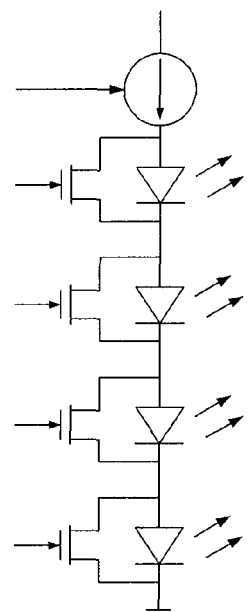
FIG. 2A shows an alternative arrangement of the constant current source and the switches used for selectively activating/deactivating the solid state light emitting elements.

In the example of FIG. 2, the tapped line of n LEDs 19 uses control of the source and control of the n−1 switches (switching transistors 35) to selectively activate 1 to n LEDs in the OFF-state and n different ON states. Those skilled in the art will recognize that other arrangements may be used to selectively activate the n LEDs. For example, as shown in FIG. 2A, the circuit might include n switches with each switch connected across (to shunt around) a respective one of the n LEDs. With such an arrangement, the MCU might activate the LEDs in different orders for the various states (except the full ON state) at different times, e.g. to so as to average the operation time of all of the LEDs and thus avoid excessive use of a particular LED (e.g. as compared to the arrangement in FIG. 2 in which the LED $19_1$ is ON whenever the system emits light but the LED $19_4$ is only ON during the full ON state).

In the 4 LED example of FIG. 2, the system provides 4 steps of different output intensities, 25%, 50%, 75% or 100% depending on whether 1, 2, 3 or 4 LEDs are ON. Of course those skilled in the art will recognize that the principles exemplified by the simple 4 LED circuit of FIG. 2 may be expanded to systems that utilize a substantially larger number of LEDs. In a system having more LEDs, output may be controlled in a corresponding number steps by similar activation of the LEDs on a one by one individual LED basis. Alternatively, some number in the larger set of LEDs may be controlled in common as a group. Using the circuit of FIG. 2 as an example, the set 19 of the LEDs might have a string of w LEDs at the location of LED $19_1$ in the drawing, a string of x LEDs at the location of LED $19_2$ in the drawing, a string of y LEDs at the location of LED $19_3$ in the drawing, a string of z LEDs at the location of LED $19_4$ in the drawing. Within each such string, the LEDs may be arranged in any convenient parallel and/or serial connection. The numbers w, x, y and z of LEDs in the various strings may be equal or different. However, if different in number, selective activation of the strings individually and in various combinations of two or three of the strings, the system can offers an increased number of interim steps between the OFF level and the maximum or full ON intensity level.

Figures 3, 4:
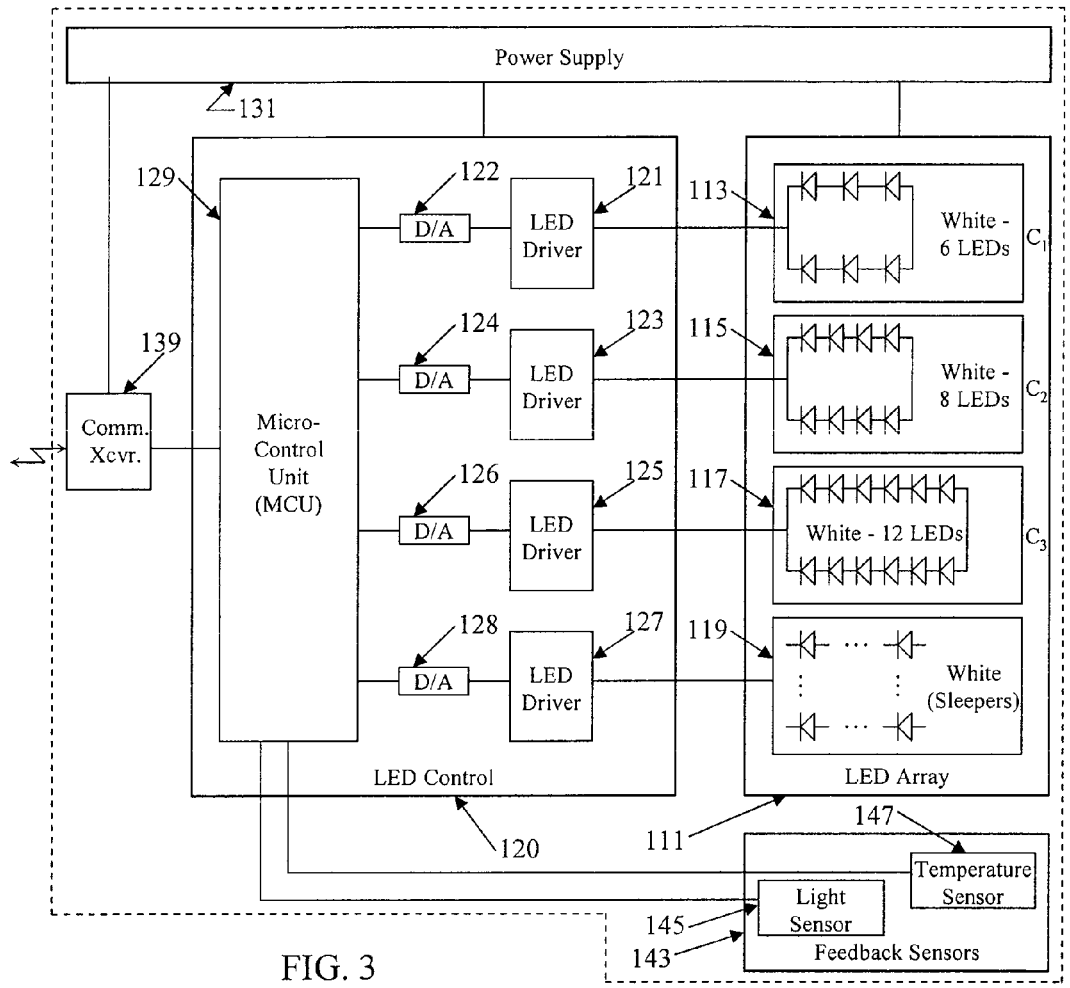
FIG. 3 is a functional block type circuit diagram, of a second implementation of the system circuitry.
FIG. 4 is a table of the intensity states for different settings, which may be provided by the circuitry of FIG. 3.

FIG. 3 is block diagram of another implementation of control circuitry and LED light sources, which may be utilized in a solid state lighting system similar to that described above relative to FIG. 1. The circuitry provides digital programmable control, including step-wise control of ON/OFF states of LEDs to control system output intensity in a step-wise manner. A circuit similar to that of FIG. 3 has been used in the past, for example, for RGB type lighting (see e.g. U.S. Pat. No. 6,995,355). The same circuit is being used here with all white LEDs and with different programming, to provide step-wise intensity control in an all white lighting system having a substantial number of LEDs. The optical processing elements of the fixture, such as the elements forming the cavity and/or a deflector, are omitted for convenience, but would be similar to those discussed above relative to FIG. 1 and to elements disclosed in U.S. Pat. No. 6,995,355.

Although other types of solid state light emitting elements may be used, in the circuit example of FIG. 3, the solid state sources take the form of a LED array 111. The array 111 comprises one or more LEDs arranged in each of four different strings. Although the present teachings may be extended to systems utilizing multiple colors of LEDs, in this example, the LEDs are all white LEDs.

Here, the array 111 includes three initially active strings of LEDs, represented by LED blocks 113, 115 and 117. The strings may have the same number of one or more LEDs, or the strings may have various combinations of different numbers of one or more LEDs. For purposes of discussion, we will assume that the first block or string of LEDs 113 comprises 6 LEDs. The LEDs may be connected in series, but in the example, two sets of 3 series connected LEDs are connected in parallel to form the block or string of 6 white LEDs 113. The LEDs may be considered as a first channel $C_1$, for control purposes discussed more later.

In a similar fashion, the second block or string of LEDs 115 comprises 8 LEDs. The 8 LEDs may be connected in series, but in the example, two sets of 4 series connected LEDs are connected in parallel to form the block or string of 8 white LEDs 115. The third block or string of LEDs 117 comprises 12 LEDs. The 12 LEDs may be connected in series, but in the example, two sets of 6 series connected LEDs are connected in parallel to form the block or string of 12 white LEDs 117. The LEDs 115 may be considered as a second channel $C_2$, whereas the LEDs 117 may be considered as a third channel $C_3$, for control purposes discussed more later.

The LED array 111 in this example also includes a number of additional or 'other' LEDs 119. Some implementations may include various color LEDs, such as specific primary color LEDs, IR LEDs or UV LEDs, for various purposes. Another approach might use the LEDs 119 for a fourth channel to control intensity in a step-wise manner. In the example, however, the additional LEDs 119 are 'sleepers.' Initially, the LEDs 113-117 would be generally active and operate in the normal range of intensity settings, whereas sleepers 119 initially would be inactive. Inactive LEDs are activated when needed, typically in response to feedback indicating a need for increased output (e.g. due to decreased performance of some or all of the originally active LEDs 113-117). The set of sleepers 119 may include any particular number and/or arrangement of the LEDs as deemed appropriate for a particular application.

Each string may be considered a solid state light emitting element coupled to supply light to the cavity, where each such element or string comprises one or more light emitting diodes (LEDs) serving as individual solid state emitters. In the example of FIG. 3, each such element or string 113 to 119 comprises a plurality of LEDs.

The electrical components shown in FIG. 3 also include a LED control system 120. The control system 121 includes LED driver circuits for the various LEDs of the array 111 as well as a micro-control unit (MCU) 129. In the example, the MCU 129 controls the LED driver circuits via digital-to-analog (D/A) converters. The driver circuit 121 drives the LEDs 113 of the first channel $C_1$, the driver circuit 123 drives the LEDs 115 of the second channel $C_2$, and the driver circuit 125 drives the LEDs 117 of the third channel $C_3$. In a similar fashion, when active, the driver circuit 127 provides electrical current to the other LEDs 119.

This example uses constant current to the LEDs, although the present concepts may be extended to systems that modulate the drive currents for other control purposes. Hence, the intensity of the emitted light of a given LED in the array 111 is proportional to the level of current supplied by the respective driver circuit. The current output of each driver circuit is controlled by the higher level logic of the system, in this case, by the programmable MCU 129 via the respective A/D converter.

The driver circuits supply electrical current at the respective levels for the individual sets of LEDs 113-119 to cause the LEDs to emit light. The MCU 129 controls the LED driver circuit 121 via a D/A converter 122, and the MCU 129 controls the LED driver circuit 123 via a D/A converter 124. Similarly, the MCU 129 controls the LED driver circuit 125 via a D/A converter 126. The amount of the emitted light of a given LED set is related to the level of current supplied by the respective driver circuit.

In a similar fashion, the MCU 129 controls the LED driver circuit 127 via the D/A converter 128. When active, the driver circuit 127 provides electrical current to the sleeper LEDs 119.

The LED driver circuits and the microcontroller 129 receive power from a power supply 131, which is connected to an appropriate power source (not separately shown). For most illumination applications, the power source will be an AC line current source, however, some applications may utilize DC power from a battery or the like. The power supply 131 provides AC to DC conversion if necessary, and converts the voltage and current from the source to the levels needed by the LED driver circuits and for the PAM modulators and the MCU 129.

A programmable microcontroller or microprocessor, such as the MCU 129, typically includes or has coupled thereto random-access memory (RAM) for storing data and read-only memory (ROM) and/or electrically erasable read only memory (EEROM) for storing control programming and any pre-defined operational parameters, such as pre-established light data for the current setting(s) for the strings of LEDs 113 to 119. The microcontroller 129 itself comprises registers and other components for implementing a central processing unit (CPU) and possibly an associated arithmetic logic unit. The CPU implements the program to process data in the desired manner and thereby generate desired control outputs. The microcontroller 129 is programmed to control the LED driver circuits 121 to 127 via the A/D converters 122 to 128 to set the individual output intensities of the LEDs to desired levels, and to implement the step-wise system intensity control by selectively activating and deactivating strings of LEDs. For an ON-state of a string/channel, the program of the microcontroller 129 will set the level of the current to the desired level at or around the rated current, by providing an appropriate data input to the D/A converter for the channel.

The electrical system associated with the fixture also includes a digital data communication interface 139 that enables communications to and/or from a separate or remote transceiver (not shown in this drawing) which provides communications for an appropriate control element, e.g. for implementing a desired user interface. A number of fixtures of the type shown may connect over a common communication link, so that one control transceiver can provide instructions via interfaces 139 to the MCUs 129 in a number of such fixtures. The transceiver at the other end of the link (opposite the interface 139) provides communications to the fixture(s) in accord with the appropriate protocol. Different forms of communication may be used to offer different links to the user interface device. Some versions, for example, may implement an RF link to a personal digital assistant by which the user could select intensity or brightness settings. Various rotary switches and wired controls may be used, and other designs may implement various wired or wireless network communications. Any desired medium and/or communications protocol may be utilized, and the data communication interface 139 may receive digital intensity setting inputs and/or other control related information from any type of user interface or master control unit.

To insure that the desired performance is maintained, the MCU 129 in this implementation receives feedback signal from one or more sensors 143. A variety of different sensors may be used, alone or in combination, for different applications. In the example, the sensors 143 include a light intensity sensor 145 and a temperature sensor 147. The MCU 129 may use the sensed temperature feedback in a variety of ways, e.g. to adjust operating parameters if an excessive temperature is detected.

The light sensor 145 provides intensity information to the MCU 129. A variety of different sensors are available, for use as the sensor 145. The light sensor 145 is coupled to detect intensity of the integrated light either emitted through the aperture or as integrated within the optical cavity, e.g. in cavity 11 in the example of FIG. 1. The sensor 145 may be mounted alongside the LEDs for directly receiving light processed within the cavity. However, some small amount of the integrated light passes through a point on a wall of the cavity, therefore it may be sufficient to sense light intensity at that point on the cavity wall. The MCU 129 uses the intensity feedback information to determine when to activate the sleeper LEDs 119. The intensity feedback information may also cause the MCU 129 to adjust the constant current levels applied to the LEDs 113 to 117 in the control channels $C_1$ to $C_3$, to provide some degree of compensation for declining performance before it becomes necessary to activate the sleepers.

Control of the LED outputs could be controlled by selective modulation of the drive signals applied to the various LEDs. For example, the programming of the MCU 129 could cause the MCU to activate the A/D converters and thus the LED drivers to implement pulse width or pulse amplitude modulation to establish desired output levels for the LEDs of the respective control channels $C_1$ to $C_3$. However, in the example, the MCU 129 simply controls the light output levels by activating the A/D converters to establish and maintain desired magnitudes for the current supplied by the respective driver circuit and thus the proportional intensity of the emitted light from each given string of LEDs. For an ON-state of a string/channel, the program of the MCU 129 will cause the MCU to set the level of the current to the desired level at or around the rated current, by providing an appropriate data input to the D/A converter for the particular channel. The LED light output is proportional to the current from the respective driver, as set through the D/A converter. The D/A converter will continue to output the particular analog level, to set the current and thus the LED output intensity in accord with the last command from the MCU 129, until the MCU 129 issues a new command to the particular D/A converter. While ON, the current will remain relatively constant. The LEDs of the string thus output light of a corresponding relatively constant intensity. Since there is no modulation, it is expected that there will be little or no change for relatively long periods of ON-time, e.g. until the temperature or intensity feedback indicates a need for adjustment.

The current for the different channels $C_1$ to $C_3$ and/or the sleeper LEDs 119 may be different, e.g. if different types of LEDs are used, but where the LEDs in the array 111 are all of the same type, the current for the different channels $C_1$ to $C_3$ and/or the sleeper LEDs 119 in the ON state would all be approximately the same magnitude. For the OFF state of a particular string of LEDs 113 to 119, the MCU provides a 0 data input to the D/A converter for the respective string of LEDs.

Setting of the ON-OFF states of the LED strings 113-117 provides for selective control of the overall number of LEDs of the array 111 that are ON in any given state. As shown by the table in FIG. 4, it is possible to control the states of the LED strings 113-117 to provide eight different brightness steps from 0 to 7, that is to say from all OFF (0 LEDs ON) to all 26 of the LEDs ON.

For the step-wise intensity control, the MCU 129 will control each driver via its associated A/D converter so as to supply constant current to the respective string of LEDs, at or around the rated current of the particular set of LEDs. Based on feedback, the MCU may adjust the level of the constant current somewhat, e.g. to compensate for some degree of degradation over time before it becomes necessary to activate the sleeper LEDs 119. In any case, the current level will remain within a range of the rated current for the particular string/channel of LEDs so that those LEDs produce the rate color temperature of white light without a color shift.

The table in FIG. 4 shows the different states of brightness as well as the ON (1) and OFF (0) states for the for the different control channels C1 to C3 in the circuit of FIG. 3 for the various levels of output intensity/brightness. The left column shows the intended brightness level. The right column of the table shows the total number of LEDs that are ON in each system brightness state. In the example, there are 8 possible system states or intensities, which range from 0 for full OFF up to 7 for maximum ON. To select among the states, the communication interface 139 would receive a data signal from an input device, e.g. a user interface or a higher level automatic control, and would supply at least 3-bits of intensity control data to the MCU 129.

In the 0 state, all of the control channels C1 to C3 are OFF, and thus there are no LEDs ON. Conversely, in the 7 state, all of the control channels C1 to C3 are ON, and thus all 26 of the LEDs 113-117 are ON. The other states provide a series of steps between full OFF and full ON.

For example, at the brightness level number 1, only the first control channel C1 is ON, and the other channels $C_2$ and $C_3$ are OFF. In that state, only the 6 LEDs of the first control channel $C_1$ are ON. At the brightness level number 2, only the second control channel $C_2$ is ON, and the other channels $C_1$ and $C_3$ are OFF. In that state, only the 8 LEDs of the second control channel $C_2$ are ON. Similarly, at the brightness level number 3, only the third control channel $C_3$ is ON, and the other channels $C_1$ and $C_2$ are OFF. In that state, only the 12 LEDs of the third control channel $C_3$ are ON.

In the next three states (brightness levels 4-6) different combinations of two channels are ON concurrently. For example, at the brightness level number 4, the first control channel $C_1$ and the second control channel $C_2$ are both ON, but the other channel $C_3$ is OFF. In that state, the 14 LEDs of the channels $C_1$ and $C_2$ are ON. At the brightness level number 5, the first control channel $C_1$ and the third control channel $C_3$ are both ON, but the other channel $C_2$ is OFF. In that state, the 18 LEDs of the channels $C_1$ and $C_3$ are ON. Similarly, at the brightness level number 6, the second control channel $C_2$ and the third control channel $C_3$ are both ON, but the other channel $C_1$ is OFF. In that state, the 20 LEDs of the channels $C_2$ and $C_3$ are ON.

The system can step up or down through the levels, in response to appropriate control inputs, e.g. received from a user interface element. Assuming that all of the LEDs generate approximately the same light output at the rated current setting, the system intensity will be proportional to the number of LEDs ON at each level. Hence, in the example, the possible brightness steps will correspond to the levels of intensity at which 0, 6, 8, 12, 14, 18, 20, and 26 LEDs are ON, respectively.

In the example, assume that all of the LEDs in the array 111 are similar type devices. All will have the same current rating at which they are all expected to output white light of a particular color temperature. In the ON state, each LED runs at or near its rated current, that is to say in a region within a range of the rated current that will not result in a color shift. Hence, in all states, the light output will correspond in color to the color temperature intended for the LED's rated operation state. As the system dims its output, LEDS are shut-OFF, but the LEDs that remain ON still operate at that current and provide the rated color output. As a result, changing the system intensity does not produce any color shift, e.g. due to changes in the current applied to any of the LEDs. Also, since there is no pulse modulation change, there is no potential to change to a state which might otherwise cause perceptible flickering.

As noted earlier, the circuit of FIG. 3 also offers sleeper LEDs 119. With the channels $C_1$ to $C_3$ all ON, the system would operate at its rated output level, but typically that is around 90% of the maximum output possible for the array 111, as the sleepers 119 will be OFF. If the intensity achieved by activation of the channels $C_1$ to $C_3$ drops, for example as indicated by level of intensity detected by sensor 145, the MCU 129 can turn ON the string of sleepers 119, to return to the desired performance level. Sleepers 119 then could be always ON whenever the system is ON, and the MCU 129 would control intensity by ON-OFF control of the LEDs on channels $C_1$ to $C_3$.

The circuit examples discussed above utilized programmed digital controllers as the control logic. Also, the controllers were responsive to a variety of input devices. It may also be desirable to implement the step-wise intensity control in a solid state lighting system utilizing a simpler circuit arrangement for input and control. In this regard, it may be helpful to consider the example of FIG. 5.

The system 200 utilizes a standard dimmer control 201 as the user interface for inputting the desired intensity setting. A dimmer, such as that shown at 201 receives, standard AC house current, e.g. via a plug 203. The dimmer modifies a parameter of the AC current to change the power at its output. For example, FIG. 6A shows a cycle of a sinusoidal waveform of an AC power signal. In the US for example, the signal would be a 60 Hz cycle signal of 120 volts AC. When ON, the rotational position of the dimmer 201 determines the duty cycle of the AC that the dimmer outputs. AC signals of different duty cycles will exhibit different phase characteristics. Several levels of possible duty cycle percentages are represented by the numbers along the axis in FIG. 6A. The full cycle shown in FIG. 6A would correspond to a cycle of the full ON waveform, which will be setting 4 and provide maximum intensity in this example.

However, at lower settings, the dimmer reduces the ON time (non-zero portion) of the AC waveform of each cycle. Typically, the dimmer cuts-off a portion of each cycle of the waveform to reduce average power. In many existing dimmers, the duty cycle control provides an substantially continuous analog range of duty cycle variation. For the step-wise control, ranges around certain levels of the duty cycle will be recognized as selections of discrete intensity settings, that is to say input setting values from 1 to 4 in our example.

Around level 3, for example, the dimmer 201 will output a waveform similar to that represented by the solid line portion of the cycle shown in FIG. 6B. The dotted line portions of the cycle in that drawing represent the leading portions cut-off by the dimmer to reduce the duty cycle and thus reduce the average power output. Similarly, around level 2, for example, the dimmer 201 will output a waveform similar to that represented by the solid line portion of the cycle shown in FIG. 6C. Around level 1, for example, the dimmer 201 will output a waveform similar to that represented by the solid line portion of the cycle shown in FIG. 6D. Those skilled in the art will recognize that different duty cycle levels may be used to indicate the desired intensity setting values and/or that the system may be configured to detect a smaller or a larger number of duty cycle levels as such input values.

For purposes of step-wise control, the output of the dimmer 201 is supplied to a phase ($\Phi$) detector circuit 205 configured with threshold detectors or the like to discriminate phase states of the dimmer output signal. In the example, the thresholds used for such discrimination discriminate 4 possible phase states at which the modified AC signal from the dimmer is ON. The phase detector essentially produces a signal proportional to the phase of the waveform received at its input. As the duty cycle changes, the starting point of each half of the waveform changes, and the phase detector produces a different signal representative of the respective phase shift. The threshold detectors are used to determine the level of the phase shift signal in relation to break-points approximating the levels 1 to 4 in the example of FIGS. 6A to 6B. The 4 phase states detected by the discriminator in this way are used to provide 4 intensity settings. Of course, the system will turn OFF in response to an OFF condition (no AC current) on the output of the dimmer 201. In the example, the phase ($\Phi$) detector circuit 205 provides a high or low output on one of 4 respective outputs, based on which of the 4 ON phase states it detects. When there is no current from the dimmer, the detector 205 will set all 4 of its outputs low.

The phase detection signals from the detector circuit 205 serve as inputs to the LED control circuit 207 of the system 200. The LED control circuit 207 could be implemented in a manner similar to the other examples, e.g. using a programmable micro-control unit. FIG. 5, however, illustrates an alternative approach. Any appropriate state machine for implementing the necessary logic could be used. Here, the LED control circuit 207 includes a logic circuit 209 made up of logic gates arranged to provide simple ON/OFF logic for three control channels in response to the phase detection signals from the discriminator 205. The logic of the circuit 209 will be discussed more, later, with regard to the states illustrated in FIG. 7.

The example of FIG. 5 provides three control channels for ON/OFF control of three strings of LEDs, although the system could be configured for other numbers of channels. Hence, in the three channel example, the control circuit 207 includes three LED drivers, in this case, in the form of three constant current source circuits $211_1$ to $211_3$. A single constant current source and tap control could be used, as in FIG. 2 or 2A; but here the three constant current source circuits $211_1$ to $211_3$ are separately activated and deactivated by the three outputs of the logic circuit 209. Each source $211_1$ to $211_3$ provides constant current of a set amount for one of three strings of LEDs. If the LEDs are all similar devices, the sources may be set to provide substantially the same constant level of current. If the strings use different types of LEDs, the sources may be set to supply somewhat different constant current levels. In any case, the current level supplied by the particular source will be in a range around the rated current level for the LEDs of the string driven by the respective source.

The circuit 207 also includes a power supply circuit 213. The logic circuit 209 and the three constant current source circuits $211_1$ to $211_3$ draw power from the supply 213. The power supply circuit 213 is coupled to an AC source, for example via the plug 215. In operation, the power supply 213 converts AC power to the form necessary to drive the logic circuit 209 and the constant current source circuits $211_1$ to $211_3$.

The solid state lighting system 200 also includes a light fixture or lamp 217. The fixture 217 includes an optical integrating cavity 219 having an optical aperture 221 for allowing passage of light diffusely processed within the cavity 219 toward a region to be illuminated by the system 200. The elements forming the fixture 217, particularly the elements forming the cavity 219 and aperture 221, are similarly constructed and arranged and similarly serve to form a virtual source output as did corresponding elements of the elements of the system of FIG. 1.

The fixture 217 also is coupled to or includes LEDs 223, in this case, electrically connected to form three strings of LEDs $223_1$, $223_2$ and $223_3$, for control as the optical output of control channels $C_1$, $C_2$ and $C_3$, respectively. For example, the LEDs 223 typically will all produce the same color of light, e.g. white light of the same temperature. Of course those skilled in the art will recognize that the system 200 could be adapted to utilize LEDs of different colors, where the light is integrated in the cavity 219 to form light of a desired color for output via the aperture 221.

Although shown schematically in FIG. 5, the LEDs 223 will be located and/or coupled to the cavity 219 in a manner similar to the LEDs 19 in the system 10 of FIG. 1. As such, direct emissions from all of the LEDs 223 will reflect diffusely from a surface of the optical integrating cavity 219. Diffusely reflected light will be integrated within the cavity 219 and uniformly spread for output via the aperture 219. The uniform light output at the aperture 221 will form a virtual source, as in the earlier example.

In this example, assume that the three strings of LEDs $223_1$, $223_2$ and $223_3$ have different numbers of LEDs. For example, the $C_1$ string of LEDs $223_1$, has 6 white LEDs, the $C_2$ string of LEDs $223_2$ has 8 white LEDs, and the $C_3$ string of LEDs $223_3$ has 12 white LEDs. In response to the phase detection signals from the discriminator 205, the logic circuit 209 activates and deactivates the constant current sources $211_1$, $211_2$ and $211_3$ to turn ON and OFF the three strings of LEDs $223_1$, $223_2$ and $223_3$. When the dimmer is OFF, the outputs of the detector 205 will all be low, and the logic circuit turns all three sources OFF, therefore all of the LEDs 223 will be OFF. However, when the dimmer provides a signal relating to an ON state, the phase detection signals from the discriminator 205, indicates the input level from 1 to 4, and the logic circuit 209 activates and deactivates the current sources to turn ON and OFF the respective LEDs to implement the control states illustrated in FIG. 7.

As shown in FIG. 7, when the discriminator indicates a state of the dimmer output signal corresponding to state 4 (at or around the waveform of FIG. 6A), all of the LEDs 223 for all three channels $C_1$ to $C_3$ will be ON (see right column of FIG. 7). To implement this output state, the logic circuit 209 will turn ON all three of the constant current sources $211_1$ to $211_3$. All 26 LEDs will be ON. The virtual source at the luminous output area of the fixture 217, that is to say at the aperture 221 in the example, will have maximum brightness.

When the discriminator 205 indicates a state of the dimmer output signal corresponding to state 3 (at or around the waveform of FIG. 6B), the LEDs $223_1$ and $223_3$ for the first and third channels $C_1$ and $C_3$ will be ON (see next to last column to the right in FIG. 7). To implement this output state, the logic circuit 209 will turn ON the first and third constant current sources $211_1$ and $211_3$. 18 LEDs will be ON in this state. The virtual source at the luminous output area of the fixture 217, that is to say at the aperture 221 in the example, will have a reduced brightness proportional to the number of LEDs that are ON (18 of 26).

When the discriminator 205 indicates a state of the dimmer output signal corresponding to state 2 (at or around the waveform of FIG. 6C), the LEDs $223_3$ for the third channel $C_3$ will be ON. Other LEDs will be OFF. To implement this output state, the logic circuit 209 will turn ON only the third constant current source $211_3$. 12 LEDs will be ON in this state. The virtual source of the fixture 217 at the aperture 221 will have a reduced brightness proportional to the number of LEDs that are ON (12 of 26).

When the discriminator 205 indicates a state of the dimmer output signal corresponding to state 1 (at or around the waveform of FIG. 6D), the LEDs $223_1$ for the first channel $C_1$ will be ON. Other LEDs will be OFF. To implement this output state, the logic circuit 209 will turn ON only the first constant current source $211_1$. 6 LEDs will be ON in this state. The virtual source of the fixture 217 at the aperture 221 will have a reduced brightness proportional to the number of LEDs that are ON (6 of 26).

In the example of FIGS. 5-7, the control provides 4 ON-states having different discrete levels of brightness, proportional to the number of LEDs that are ON in each state. In state 1, the brightness would be proportional to the 6 LEDs being ON. In state 2, the brightness would be proportional to the 12 LEDs being ON. In state 3, the brightness would be proportional to the 18 LEDs being ON; and in the full-ON state 4, the brightness would be proportional to the 26 LEDs being ON. The control circuit 207 will step up or down through these states as the phase detector and threshold detectors in discriminator 205 sense changes in phase of the signal from the dimmer 201, caused by a user's adjustment of the dimmer. However, in each state the current sources drive all of the active LEDs with constant current at or around the rated current level of the LEDs. As a result, each respective LED always provides the same output level and color. Thus, in each state, the virtual source output at the aperture 221 will have the same color temperature of the white light output, and the distribution across that luminous output area will be substantially uniform as discussed earlier. All that is visible as LEDs are turned ON and OFF is a visible change in intensity.

In the example of FIG. 5, the dimmer circuit provided the intensity setting input signals. However, power to the control circuit 207 and thus to the fixture 217 was provided by a separate AC power circuit. It may also be possible to derive power from the dimmer circuit, however, it would be necessary to compensate for the reduced duty cycle on that circuit so as to maintain adequate power for the constant current supplies, albeit for the reduced number of active LEDs.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A lighting system, comprising:
a first solid state light emitting element for emitting a color of light;
a second solid state light emitting element for emitting the same color of light emitted from the first solid state light emitting element;
an optical processing element coupled to receive light emitted from the first and second solid state light emitting elements, for processing the received light to produce a virtual source of light of said color at a luminous output area of the lighting system; and
a control circuit connected to the first and second solid state light emitting elements, wherein the control circuit is configured to implement functions, including functions to:
(a) drive each of the first and second solid state light emitting elements to operate at a respective predetermined level; and
(b) selectively activate and deactivate function (a) with respect to the first and second solid state light emitting elements to selectively switch the first and second solid state light emitting elements to and from said respective predetermined levels, in combinations to provide a plurality of discrete intensity levels for the virtual source of light of said color at the luminous output area of the lighting system.

2. The lighting system of claim 1, wherein:
the first solid state light emitting element comprises a first plurality of solid state emitters of a type for emitting the color of light; and
the second solid state light emitting element comprises a second plurality of solid state emitters of a type for emitting the color of light.

3. The lighting system of claim 2, wherein the first plurality of solid state emitters is equal in number to the second plurality of solid state emitters.

4. The lighting system of claim 2, wherein the first plurality of solid state emitters is different in number from the second plurality of solid state emitters.

5. The lighting system of claim 4, wherein:
the first plurality of solid state emitters comprises a first string of light emitting diodes (LEDs) of a first number; and
the second plurality of solid state emitters comprises a second string of LEDs of a second number different from the first number.

6. The lighting system of claim 1, wherein the control circuit comprises:
at least one driver circuit, for providing at least one drive signal for the first and second solid state light emitting elements to drive the solid state light emitting elements at the respective levels; and
a programmable processor for receiving an input specifying a desired brightness and connected to control the at least one driver circuit in response to the received input.

7. The lighting system of claim 6, wherein the at least one driver circuit comprises:
a first driver circuit selectively activated and deactivated by the processor for providing a drive signal for the first solid state light emitting element; and
a second driver circuit selectively activated and deactivated by the processor for providing a drive signal for the second solid state light emitting element.

8. The lighting system of claim 7, wherein the first and second driver circuits comprise constant current sources.

9. The lighting system of claim 1, wherein the optical processing element comprises:
- an optical integrating cavity having a reflective interior surface, at least a portion of which exhibits a diffuse reflectivity, the optical integrating cavity being coupled for receiving the light emitted from the first and second solid state light emitting elements for diffuse reflective processing within the optical integrating cavity; and
- an optical aperture for allowing emission of processed light from within the optical integrating cavity, wherein the diffuse reflective processing within the optical integrating cavity produces the virtual source of light of said color at the luminous output area of the lighting system at or downstream from the optical aperture.

10. The lighting system of claim 9, wherein the diffuse reflective processing within the optical integrating cavity produces the virtual source at the optical aperture.

11. The lighting system of claim 10, wherein:
- each of the first and second solid state light emitting elements is coupled to emit light of said color into the optical integrating cavity from a location on a wall of the optical integrating cavity; and
- the locations on the wall of the optical integrating cavity are such that substantially all light emissions entering the cavity from the emitting elements reflect at least once within the optical integrating cavity before emission via the virtual source.

12. The lighting system of claim 11, wherein diffuse reflection within the optical integrating cavity produces a substantially uniform intensity distribution across the entire optical aperture.

13. The lighting system of claim 12, wherein the intensity distribution across the entire optical aperture is substantially Lambertian.

14. The lighting system of claim 12, wherein the intensity distribution across the entire optical aperture is unpixelated.

15. The lighting system of claim 12, wherein the intensity distribution across the entire optical aperture exhibits a maximum-to-minimum ratio of 2:1 or less.

16. The lighting system of claim 12, wherein area of the optical aperture is substantially larger than combined area of point source outputs of light emitted from the first and second solid state light emitting elements at the locations on the wall of the cavity.

17. In a solid state lighting system comprising a first solid state light emitting element for emitting a color of light and a second solid state light emitting element for emitting the same color of light as the first solid state light emitting element, a method of controlling intensity of light output from the system, the method including steps comprising:
- receiving a first input representing a first desired brightness level;
- in response to the first input, activating the first solid state light emitting element to emit light of a color at a predetermined intensity level for the first solid state light emitting element by turning a current to the first solid state light emitting element ON, while maintaining the second solid state light emitting element in a deactivated state by keeping current to the second solid state light emitting element OFF;
- diffusely processing light emitted from the first solid state light emitting element to produce a virtual source of light of said color at a luminous output area of the lighting system, corresponding in intensity to the first desired brightness level;
- receiving a second input representing a second desired brightness level higher than the first desired brightness level;
- in response to the second input, activating the first solid state light emitting element to emit light of the color at the predetermined intensity level for the first solid state light emitting element and activating the second solid state light emitting element to emit light of the color at a predetermined intensity level for the second solid state light emitting element by turning a current to each of the respective solid state light emitting elements ON; and
- diffusely processing light emitted from the first and second solid state light emitting elements to produce a virtual source of light of said color at the luminous output area of the lighting system corresponding in intensity to the second desired brightness level.

18. The method of claim 17, wherein:
- first solid state light emitting element comprises a first number of light emitting diodes (LEDs); and
- the second solid state light emitting element comprises a second number of light emitting diodes (LEDs).

19. The method of claim 18, wherein:
- the second number of LEDs is larger than the first number of LEDs; and
- the method further comprises:
  - (a) receiving a third input representing a third desired brightness level between the first and second desired brightness levels;
  - (b) in response to the third input, driving the second solid state light emitting element to emit light of the color at the predetermined intensity level for the second solid state light emitting element, while maintaining the first solid state light emitting element in an inactive state; and
  - (c) diffusely processing light emitted from the second solid state light emitting element to produce a virtual source of light of said color at the luminous output area of the lighting system corresponding in intensity to the third desired brightness level.

20. The method of claim 17, wherein each step of diffusely processing comprises:
- receiving light from any and all active ones of the first and second solid state light emitting elements;
- diffusely reflecting the received light within an optical cavity; and
- emitting diffusely reflected light from the cavity via an optical aperture.

21. The method of claim 20, wherein the emitting of diffusely reflected light forms the virtual source of light of said color at the optical aperture.

22. The method of claim 17, wherein each step of receiving the first input or the second input comprises receiving a digital data input from a user interface device.

23. The method of claim 17, wherein each step of receiving the first input or the second input comprises receiving a signal representing a predetermined state of an AC signal from an AC dimmer circuit.

24. The method of claim 23, wherein each predetermined state relates to a threshold of phase of the AC signal from the AC dimmer circuit.

* * * * *